United States Patent [19]

Toft

[11] 4,115,279
[45] Sep. 19, 1978

[54] APPARATUS FOR SEPARATION OF OIL FROM OIL AND WATER MIXTURES

[75] Inventor: Kenneth Herman Toft, Stoke-on-Trent, England

[73] Assignee: Simon-Hartley Limited, England

[21] Appl. No.: 724,642

[22] Filed: Sep. 20, 1976

Related U.S. Application Data

[63] Continuation of Ser. No. 556,958, Mar. 10, 1975, abandoned.

[30] Foreign Application Priority Data

Mar. 26, 1974 [GB] United Kingdom ............... 13480/74

[51] Int. Cl.² .......................................... B01D 12/00
[52] U.S. Cl. ................................................. 210/521
[58] Field of Search ................... 210/83, 89, 521, 522, 210/532, 540

[56] References Cited

U.S. PATENT DOCUMENTS

| 2,573,615 | 10/1951 | Seailles ................................ 210/521 |
| 3,161,590 | 12/1964 | Weis et al. ............................ 210/521 |
| 3,182,799 | 5/1965 | Krofta .................................. 210/521 |
| 3,529,728 | 9/1970 | Middlebeek et al. ................. 210/522 |
| 3,768,648 | 10/1973 | Anderson et al. .................... 210/522 |
| 3,782,557 | 1/1974 | Pielkenrood ......................... 210/521 |

FOREIGN PATENT DOCUMENTS

| 316,169 | 12/1953 | France ................................. 210/521 |
| 242,594 | 5/1944 | Switzerland ......................... 210/521 |
| 22,546 of | 1892 | United Kingdom .................. 210/521 |
| 907 of | 1886 | United Kingdom .................. 210/521 |

Primary Examiner—Theodore A. Granger
Attorney, Agent, or Firm—Norris & Bateman

[57] ABSTRACT

An apparatus for separating oil from a mixture of oil and water wherein a stream of the mixture is directed along an upwardly inclined inverted channel to separate the oil from the mixture by contact of the oil with the under-surface of the channel for flow upwardly in the channel, and wherein the oil is collected from the upper longitudinal end of the channel and wherein the remainder of the stream is allowed to fall downwardly out of the channel.

10 Claims, 4 Drawing Figures

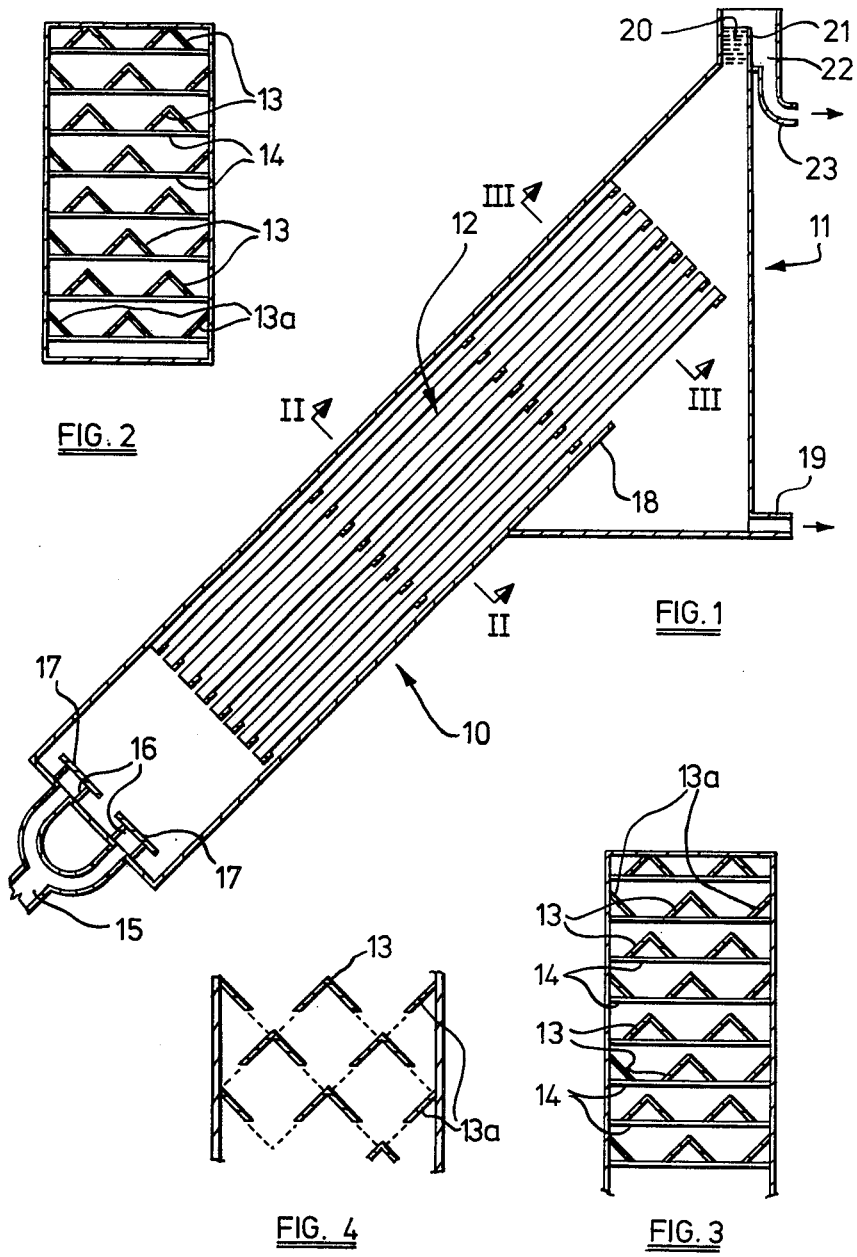

APPARATUS FOR SEPARATION OF OIL FROM OIL AND WATER MIXTURES

This is a continuation, of application Ser. No. 556,958, filed Mar. 10, 1975, now abandoned.

This invention relates to the separation and removal of oil from oil and water mixtures.

It is now quite common for the waters of the sea, harbours, rivers, drainage systems and sewage systems to become contaminated with oil. Particularly serious is the contamination of the sea by the accidental or deliberate discharge of oil from oil tankers which can result from collisions or tank cleaning operations, for example.

Separators are known wherein a mixture of oil and water is caused to flow upwardly in an inclined direction over means presenting a large surface area to the flow, whereby the oil is separated from the mixture by contact of the oil with such means. Generally, such known apparatus has the disadvantage that removal of the separated oil from the residue entails intimate contact between the two, thus preventing complete separation of the oil, on account of possible entrainment of the collected oil with the outflowing water.

It is an object of the present invention to provide an apparatus for the separation of oil from an oil and water mixture which overcomes the disadvantage aforesaid.

It is a further object of the invention to provide an apparatus for the separation and removal of oil from a mixture of oil and water which is particularly, though by no means exclusively, suitable for use on board ship.

According to the present invention, a method for separating oil from a mixture of oil and water comprises the steps of directing a stream of the mixture along an upwardly inclined inverted channel to separate the oil from the mixture by contact of the oil with the under-surface of the channel for flow upwardly in the channel, collecting the oil from the upper longitudinal end of the channel and allowing the remainder of the stream to fall downwardly out of the channel.

Also according to the invention is apparatus for carrying out the method aforesaid.

The invention will be further apparent from the following description with reference to, and as illustrated by, the several figures of the accompanying drawings, which show, by way of example only, one form of apparatus embodying the invention for performing the method thereof.

Of the drawing:

FIG. 1 shows a side elevation of the apparatus with a side wall removed to reveal the interior thereof;

FIG. 2 shows a cross-section through the apparatus on the line II—II of FIG. 1;

FIG. 3 shows a cross-section through the apparatus on the line III—III of FIG. 1; and FIG. 4 shows a detail of the structure seen in FIGS. 2 and 3 but on an enlarged scale.

Referring now to the drawing, it will be seen that the apparatus is essentially comprised by a tank, the major part of which is in the form of an upwardly inclined duct 10 of rectangular cross-section and which opens into a chamber 11 at its upper end, which chamber forms the remainder of the tank. Extending upwardly through the duct 10 is a structure 12 formed from a plurality of longitudinally extending mutually spaced parallel inverted channel members 13. The lower end of the structure 12 is upwardly spaced from the bottom of the duct 10 whilst the upper end of the structure 12 is located within the chamber 11.

Each of the members 13 is of L-shaped section, and the members 13 are arranged in layers one above the other. The members 13 in each layer are mounted on a plurality of longitudinally spaced transversely extending support bars 14. The individual members 13 are spaced from one another laterally in each layer and there is a space between the adjacent superimposed layers. Conveniently the members 13 are disposed so that their sections lie on a square lattice in the manner clearly shown in FIG. 4. Strips 13a are provided in alternate layers to complete the structure 12 and these strips also form inverted channels by engagement with the side walls of the duct 10.

The base wall of the duct 10 extends upwardly into the body of the chamber 11 to form a baffle 18 which, however, terminates somewhat below the extreme upper end of the structure 12 for reasons which will be apparent hereinafter.

An inlet pipe 15 for an oil and water mixture is provided and communicates with a plurality of discharge nozzles 16 each of which is provided with a baffle 17 to ensure that liquid entering the base of the duct 10 is stilled before flowing upwardly through the structure 12.

The base of the chamber 11 is provided with an outlet pipe 19 for water in the wall thereof furthest from the structure 12.

The apex of the chamber 11 is open to atmosphere thus to form a small reservoir 20 in which oil can collect. Oil can leave the reservoir 20 by flow over a weir 21 into a chamber 22 from which it can flow away through a pipe 23.

In use the oil and water mixture enters the duct 10 and flows upwardly through the plurality of inverted channels provided by the structure 12. The geometry of the apparatus is designed having regard to the intended rate of flow of liquid therethrough to ensure that laminar flow takes place. As the mixture flows upwardly globules of oil form, float to engage the under-surfaces of the members 13 and become trapped in the apices of the inverted channels and thus are separated from the remainder of the stream. The length of the structure 12 is such as to ensure that substantially all the oil contained within the mixture is separated in the manner described above by the time the mixture reaches that part of the structure 12 adjacent the upper end of the baffle 18.

The oil which is trapped in the apices of the channel members 13 flows upwardly therealong to the extreme upper end of the structure 12 from whence it floats to collect in the reservoir 20. The remainder of the stream, essentially oil-free water, falls downwardly out of each of the inverted channels after the stream passes the end of the baffle 18.

It will be noted that water falling out of an inverted channel in an upper layer can fall through any layers therebelow without contacting the oil streams which are moving upwardly in those layers. All the water falling from the structure 12 passes downwardly through the chamber 11 for removal through the outlet 19.

Any sediment in the mixture which might be deposited from the stream passing upwardly through the structure 12 will eventually find its way to the base of the duct 10 by sliding from the upper surfaces of the channel members 13. Such material can easily be removed from the base of the duct 10 during normal maintenance operations.

It will be understood that the rate at which a mixture of oil and water can be fed through the apparatus will be limited by the requirement for non-turbulent or laminar flow. It follows that the size of the apparatus must be increased for increased rates to throughput. It will be understood that the length of the channel members 13 will not need to be increased but that the number thereof will, thus leading to an increase in the cross-sectional area of the structure 12. For larger sizes of apparatus pairs of structures 12 may conveniently be arranged in back-to-back relationship.

The apparatus of the invention is particularly suitable for use at sea for disposing of oil slicks from the sea surface. An oil slick can be pumped aboard ship and passed through apparatus of the invention, the reclaimed oil being stored in a tank on board the ship or passed to another ship and the residual water being returned directly to the sea. Since the tank of the apparatus of the invention is almost closed, proper functioning of the apparatus is not adversely affected by movement thereof as would occur when mounted on board ship. In particularly rough conditions it might be necessary to charge the apex of the chamber 11 with a quantity of oil as a precaution against violent rocking causing water to be displaced over the weir 21 into the oil collection line 23.

It will be appreciated that it is not intended to limit the invention to the above example only, many variations, such as might readily occur to one skilled in the art, being possible without departing from the scope thereof, as defined by the appended claims.

Thus, for example, the space beneath the structure 12 and the nozzles 16 may be packed with baffling means such as Raschig rings or the like.

Again, for example, the apparatus might be housed in a tank of generally conical or pyramidal form, a plurality of structures of inverted channel members being disposed within the tank and having their upper ends converging in the region of the apex of the tank.

What is claimed is:

1. Apparatus for separating oil from a mixture of oil and water, comprising a receptacle having a lower region provided with a bottom inlet for introduction of a mixture to be separated and an upper region provided with an outlet for removing separated oil, means supporting within said receptacle an assembly comprised by a plurality of upwardly inclined laminar flow control members of inverted channel shape from end-to-end arranged in laterally spaced apart side-by-side relation in each of a plurality of spaced vertical levels, the lower ends of said members being disposed within said lower region and spaced above the floor or said receptacle for receiving the introduced mixture at the bottom of said assembly for upward flow therethrough for separation of the oil by contact with the under-surfaces of said members, and the upper ends of said members being disposed within said upper region for discharge of the oil, thus constrained, from the assembly at the upper ends of said members, means constraining said mixture for inclined upward flow in said assembly between the lower and upper regions, means in said upper region whereby the separated remainder of the mixture falls downwardly out of the assembly through spaces between the members prior to reaching the upper ends of the members, while upwardly flowing oil is confined within the said flow control members until it reaches the upper ends of said members, whereby the downwardly falling remainder of said mixture is prevented from counter flow contact with the upwardly flowing oil, and means for withdrawing the separated remainder of the mixture from the upper region of said receptacle.

2. Apparatus according to claim 1 wherein said receptacle is in the form of an upwardly inclined duct formed at its lower end to provide the receptacle floor and enlarged at its upper end to define a chamber providing said upper region, said assembly extending through said upwardly inclined duct from a position upwardly spaced from said floor to terminate within said chamber, and said mixture introduction inlet being adjacent said floor, said oil removal outlet opening into an oil collecting reservoir at the upper part of said chamber, and said means for withdrawing the separated remainder of the mixture comprising an opening in a side wall of the enlarged upper end of said duct at lower end of said chamber.

3. Apparatus as defined in claim 1 wherein said means constraining the mixture for upward flow in the assembly comprises baffle means extending upwardly along the bottom of said assembly within said upper region but terminating below the upper end of said assembly.

4. Apparatus as defined in claim 3 wherein said baffle means is effectively a continuation of a receptacle side wall enclosing said lower region.

5. Apparatus according to claim 1 wherein said channel members in each said level are spaced laterally from one another and the channel members in adjacent levels are arranged in respectively staggered relationship.

6. Apparatus according to claim 5 wherein the channel members in each level are mounted on a plurality of longitudinally spaced transversely extending support bars.

7. Apparatus according to claim 1 wherein each said channel member has an L-shaped cross-section whereby its undersurfaces define a downwardly open apex, the collected oil flowing upwardly along the channel surfaces at said apex to discharge at the upper end of said member.

8. Apparatus according to claim 7 wherein the cross-sections of the channel-shaped members are arranged to lie on a square lattice.

9. Apparatus according to claim 2 having a weir at said oil removal opening over which oil can flow for removal from said reservoir.

10. Apparatus according to claim 1, wherein each channel in a lower level passes through and terminates beyond a vertical plane passing through the ends of the channels in the level above.

* * * * *